United States Patent
Barthel et al.

(10) Patent No.: US 7,903,774 B2
(45) Date of Patent: Mar. 8, 2011

(54) METHOD FOR CREATING A SYSTEM CLOCK IN A RECEIVER DEVICE AND CORRESPONDING RECEIVER DEVICE

(75) Inventors: Joerg Barthel, Hildesheim (DE); Christian Mittendorf, Hildesheim (DE)

(73) Assignee: Robert Bosch GmbH, Stuttgart (DE)

( * ) Notice: Subject to any disclaimer, the term of this patent is extended or adjusted under 35 U.S.C. 154(b) by 1538 days.

(21) Appl. No.: 10/517,743

(22) PCT Filed: May 30, 2003

(86) PCT No.: PCT/DE03/01771
§ 371 (c)(1),
(2), (4) Date: Jul. 21, 2005

(87) PCT Pub. No.: WO03/107714
PCT Pub. Date: Dec. 24, 2003

(65) Prior Publication Data
US 2006/0176963 A1    Aug. 10, 2006

(30) Foreign Application Priority Data
Jun. 12, 2002  (DE) .................. 102 26 030

(51) Int. Cl.
*H04L 7/00* (2006.01)
(52) U.S. Cl. ......... 375/355; 375/354; 375/359; 370/324; 370/395.62; 713/400
(58) Field of Classification Search .......... 375/354, 375/355, 359; 386/66, 119; 370/324, 395.62; 713/400
See application file for complete search history.

(56) References Cited

U.S. PATENT DOCUMENTS

| | | | | |
|---|---|---|---|---|
| 6,097,776 A | * | 8/2000 | Mesiwala | 375/355 |
| 6,356,871 B1 | | 3/2002 | Hemkumar et al. | |
| 6,363,207 B1 | * | 3/2002 | Duruoz et al. | 386/68 |
| 6,674,805 B1 | * | 1/2004 | Kovacevic et al. | 375/240.28 |
| 6,816,491 B1 | * | 11/2004 | Fujii et al. | 370/394 |
| 6,988,238 B1 | * | 1/2006 | Kovacevic et al. | 714/799 |
| 7,027,773 B1 | * | 4/2006 | McMillin | 455/41.2 |
| 2002/0052975 A1 | * | 5/2002 | Yamamoto et al. | 709/251 |
| 2002/0063796 A1 | * | 5/2002 | Min | 348/523 |

FOREIGN PATENT DOCUMENTS

| | | |
|---|---|---|
| EP | 1 076 461 | 2/2001 |
| EP | 1 289 306 | 3/2003 |
| WO | 01 93579 | 12/2001 |

OTHER PUBLICATIONS

*Information Technology—Generic Coding of Moving Pictures and Associated Audio Information Systems*, International Standard, NY, Nov. 13, 1994, pp. 93, ln. 1, and 102, ln. 11.

* cited by examiner

*Primary Examiner* — Mohammad H Ghayour
*Assistant Examiner* — Leila Malek
(74) *Attorney, Agent, or Firm* — Kenyon & Kenyon LLP

(57) ABSTRACT

According to a method for generating a system time clock in a receiving device for digital packetized elementary data streams (E), the packetized elementary data streams (E) being generated in a transmitting device by sampling at a sampling frequency ($f_{sample}$) synchronized by a system time clock of the transmitting device, the sampling frequency ($f_{sample}$) of one data stream is determined in the receiving device, and the program clock reference counter is synchronized with the data stream's sampling frequency.

15 Claims, 3 Drawing Sheets

METHOD FOR CREATING A SYSTEM CLOCK IN A RECEIVER DEVICE AND CORRESPONDING RECEIVER DEVICE

FIELD OF THE INVENTION

The present invention relates to a method for generating a system time clock in a receiving device for digital data streams, the latter being generated by sampling analog signals (for example, audio or video) in a transmitting device at a sampling frequency or being already present in the form of digital data (for example, subtitles).

BACKGROUND INFORMATION

In digital multimedia systems, individual data streams, for example video and audio data as well as data channels, etc., are digitized at different sampling rates. In this case, the digital data streams have no obviously common timing base. To resynchronize individual data streams in a receiving unit after they have been transmitted, both a common timing base for the individual sampling rates and synchronization points for aligning the individual data streams with each other are needed.

The Moving Picture Expert Group (MPEG) standard defines not only coding techniques for video and audio data streams but also syntactic and semantic rules for packetizing coded data streams, making it possible to subsequently identify the individual data packets of each packetized elementary data stream (PES) and present them in the correct time sequence with respect to one another.

The MPEG standard is explained, for example, in D. Teichner; der MPEG-2-Standard (The MPEG 2 Standard) in: Femseh-und Kinotechnik, Volume 48, Number 4/1994, pages 155 to 163. The MPEG systems require a single time base reference for coding and decoding. For this purpose, a counter based on a 90 kHz frequency, known as a program clock reference (PCR) counter, is provided in the transmitter and receiver. A presentation time stamp (PTS), derived from the 90 kHz counter in the transmitter, is added to each elementary data packet to describe the time at which the data packet is presented in relation to the instantaneous status of a program clock reference (PCR) counter in the receiver.

The system time clock ($f_{transmitter}$) of the transmitter is transmitted by continuously streaming the data of a system clock reference counter to the receiver. The latter is operated directly by the system frequency. The program clock reference (PCR) counter is needed to synchronize the individual data streams (audio, video) with each other. To do this, the system time clock ($f_{transmitter}$) is divided down to the count frequency of the program clock reference counter and supplied to the program clock reference counter. The status of the PCR counter is then inserted into the individual PES data packets as a numerical value in PTS form. For transmission purposes, the different PES values for audio, video, data channels, etc. as well as the values of the system clock reference counter are then combined into a common data stream, known as the transport data stream.

The problem with synchronizing the various individual data streams reconstructed from the transport stream in the receiving device is that the values of the system clock reference counter must be transmitted from the transmitting device to the receiving device with constant delay throughout the entire system. Based on the values of the system clock reference counter and their time intervals, it is possible to recover the system clock ($f_{transmitter}$) of the transmitter in the receiving device. This system time clock (STC) of the receiving device clocks an STC counter at the receiving end. The frequency of the system time clock (STC) is supplied on the basis of the difference between an incoming value of the system clock reference counter and the status of the STC counter. At the same time, this system time clock (STC) is used to generate the receiving-end sampling frequencies ($f_{audio}$, $f_{video}$, $f_{data}$) for the different data streams (audio, video, data channels). The latter thus have the same frequency as the corresponding sampling frequencies ($f_{audio}$, $f_{video}$, $f_{data}$) in the transmitting device.

To synchronize the individual data streams, the latter are aligned with the common timing base of the system time clock (STC) counter on the basis of their PTS flags. The output time of a specific item of data in a data stream is then determined separately from the output buffer, using the system time clock counter and the PTS flags for each of the individual data streams.

The problem with synchronizing the system frequency between the transmitter and receiver is that the values of the system clock reference counter must be transmitted with a constant delay from the transmitting device to the receiving device to make sure that the system time clock (STC) is recovered correctly in the receiving device.

SUMMARY OF THE INVENTION

An object of the present invention is therefore to develop a method for generating the STC counter for digital data streams in a receiving device without the method requiring the transmission of the system clock reference counter and this without generating the system time clock.

According to the present invention, the object is achieved using the method according to the definition of the species by
determining the sampling frequency ($f_{sample}$) of one data stream in the receiving device and
synchronizing the STC counter with the sampling frequency of the data stream.

Synchronizing the STC counter in the receiving device with the determined sampling frequency of one of the data streams provides a common timing base for all data streams without having to recover the actual system time clock in the transmitting device. In contrast to conventional methods, the STC counter of the receiving unit is thus controlled by the recovered sampling frequency and not by a recovered system time clock.

In doing this, the increment of the STC counter of the receiving unit must be set so that the increment is derived from the ratio between the frequency of the program clock reference (PCR) and the sampling frequency of the corresponding data stream. The increment is settable to a constant value, the ratio between a nominal program clock reference PCR and a nominal sampling frequency being calculated and entered only once.

However, the increment may also be resupplied iteratively. To do this, it is advantageous to calculate the difference between an instantaneous flag in the elementary data stream for identifying the program clock reference and the instantaneous count of the system time clock (STC). The increment of the system time clock (STC) is corrected according to the difference calculated in each case.

To process several different data streams, such as audio, video, and data channels, the sampling frequency is determined from only one selected data stream, and the different data streams are synchronized by the common STC counter.

It is particularly advantageous to determine the sampling frequency from the elementary data stream that has the greatest sampling frequency of any of the available data streams. In an audiovisual system, the sampling frequency is usually determined from the audio data stream.

DETAILED DESCRIPTION

Figure 1:
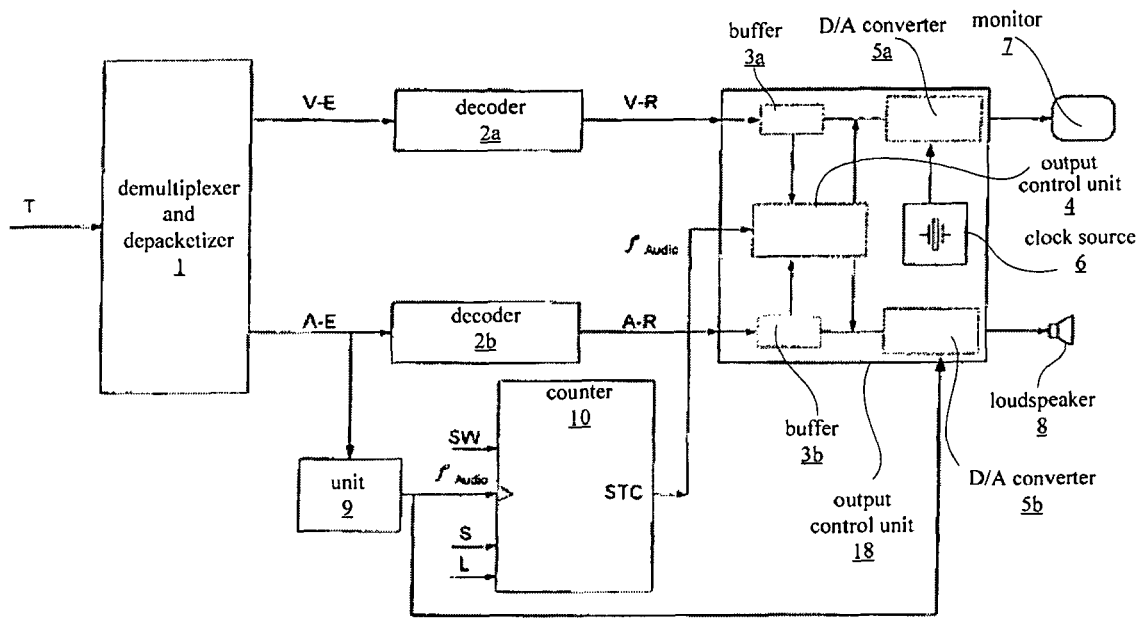
FIG. 1 shows a block diagram of a receiving device according to the present invention for digital data streams.

FIG. 1 shows a block diagram of the receiving device according to the present invention for digital data streams. The receiving device has a transport stream demultiplexer and depacketizer 1 via which a transport data stream T, which is structured, for example, according to the MPEG standard, is demultiplexed and depacketized, in the known manner, into elementary data streams E for different data content, i.e., a video elementary data stream V-E and an audio elementary data stream A-E. Transport data stream demultiplexer and depacketizer 1 is also used to extract presentation time stamp PTS from the packetized elementary data streams that may be used to construct and display the individual data packets by synchronizing them with the common STC counter at the right points in time. Known decoders 2a, 2b for video data streams V-E and audio data streams A-E are also provided. Video raw data V-R and audio raw data A-R are available at the outputs of decoders 2a, 2b. Video raw data V-R and audio raw data A-R are each buffered in a buffer 3a, 3b, controlled via an output control unit 4 by comparing the STC counter and PTS, and supplied to digital analog converters Sa, 5b, which are clocked at sampling frequencies $f'_{video}$ and $f'_{audio}$ for corresponding raw data V-R and A-R. Sampling is carried out with the help of recovered sampling frequency $f'_{audio}$ for audio and with the help of a separate clock source 6, using sampling frequency $f'_{video}$ for video. The video data is then reproduced in the form of analog data on a monitor 7, while the analog audio data is reproduced via a loudspeaker 8.

To generate the STC counter, sampling frequency $f'_{sample}$ of one of the data streams, for example audio elementary data stream A-E ($f'_{audio}$) in this case, is determined in the known manner in a unit 9 and used as the clock for STC counter 10. Based on a start value S, program clock values are counted in counting unit 10. Start value S, for example an audio PTS value, is loaded by a loading signal L, preferably at the beginning of each audio frame.

Increment SW of system time clock STC is set, for example, using a constant scaler. Increment SW is determined from the ratio between nominal program clock reference PCR and nominal sampling frequency $f_{sample}$ of elementary data stream E, which is used to increment the STC counter.

In MPEG-based systems, the sampling frequency of audio data stream A-E may be, for example, 48 kHz and the sampling frequency of video data stream V-E may be 25 Hz, i.e., 25 images per second. System time clock $f_{transmitter}$ is set to 27 MHz so that program clock reference PCR determined therefrom is defined on the basis of a scaler ratio of 1 to 300 to 90 kHz. Increment SW of synchronization unit 10 thus equals a ratio between original program clock reference PCR and the sampling frequency, i.e., 90 KHz:48 kHz=1.875. The synchronization unit is therefore not designed as an integer counter to process the decimal positions but preferably as a fixed-point counter.

Start value S is originally set by the system clock reference flags in the transmitting unit, so that the STC counter must also be initialized in the receiving unit. The PTS flags within packetized elementary data stream E whose sampling frequency is used for incrementing the counter of synchronization unit 10 are employed for this purpose. To prevent the counter of synchronization unit 10 from "running off," e.g., due to an improperly set increment SW, the counter of synchronization unit 10 is regularly recalibrated by the PTS flags. This is preferably done at the time at which the output of a new frame begins, i.e., according to the time interval at which the PTS flags are stored.

Figure 2:
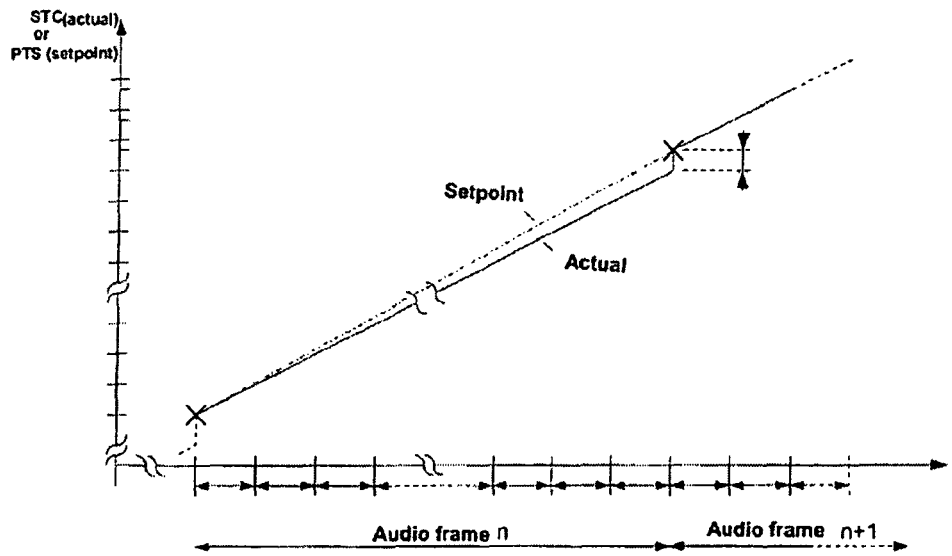
FIG. 2 shows a diagram of the STC counter value over time at a constant increment.

If increment SW is set to a fixed value, the counter of synchronization unit 10 may, however, run off due to the deviation between actual sampling frequency $f'_{sample}$ and nominal sampling frequency $f_{sample}$ so that the recalibration of the counter in synchronization unit 10 described above results in skips in the STC count. This situation is illustrated in FIG. 2. It is clear that the ideal setpoint value for the STC counter, which is represented by the dotted line, varies from the actual value of the STC counter over time. If increment SW is correct, the actual value curve would be strictly linear.

Figure 3:
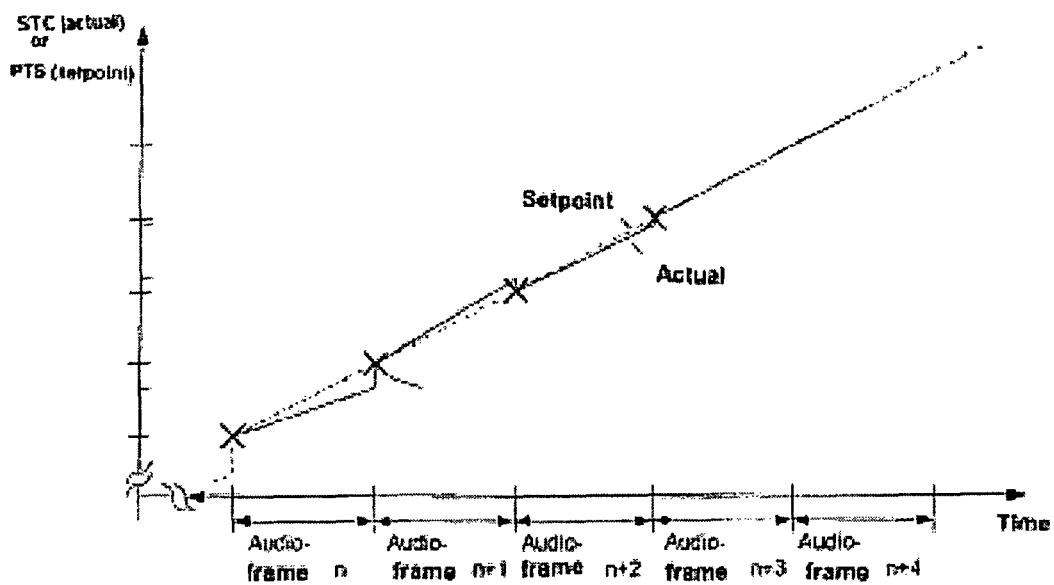
FIG. 3 shows a diagram of the STC counter value over time after correcting the increment.

As shown in FIG. 3 in the form of a diagram of STC counter values over time, increment SW of the counter in synchronization unit 10 is preferably adjusted iteratively. To do this, the difference between the actual value of the STC counter and the setpoint value of the STC counter represented by the dotted line is calculated continuously, and increment SW is corrected according to the difference after processing of an audio frame N.

Figure 4:
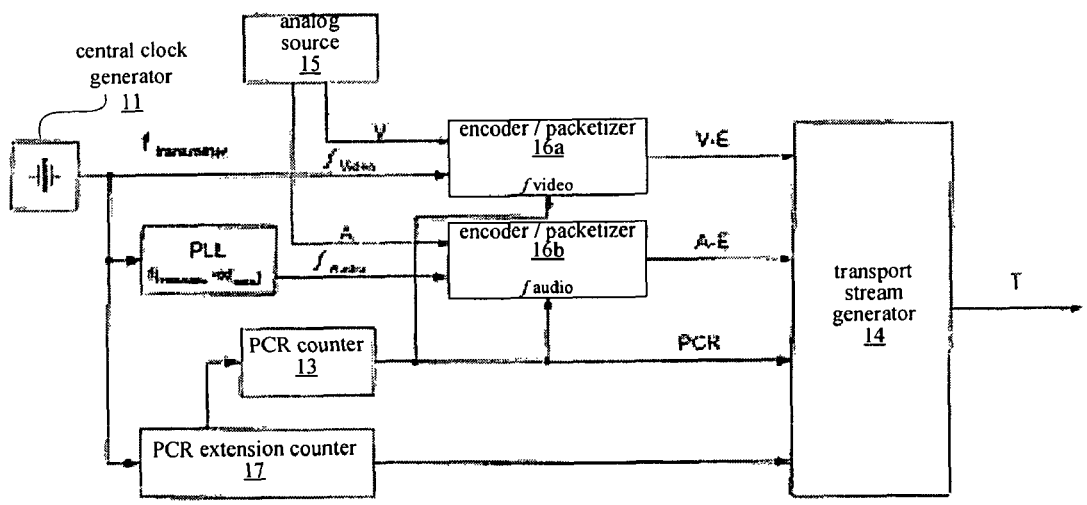
FIG. 4 shows a block diagram of a conventional transmitting device for digital data streams.

FIG. 4 shows a block diagram of a conventional transmitter unit for digital data streams. The transmitting unit has a central clock generator 11 for generating a system time clock $f_{transmitter}$. System clock frequency $f_{transmitter}$ is 27 MHz, for example in MPEG transmitting devices.

System clock $f_{transmitter}$ is divided at a ratio of 1 to 300 using a PCR extension counter 17. The 1-to-300-divided signal controls PCR counter 13. PCR and PCR extension counters jointly form the system clock reference counter. The value of PCR counter 13 is transmitted to encoder and packetizers 16a and 16b for the purpose of determining the presentation time stamps (PTS). The system clock reference counter is transmitted to transport stream generator 14. In transport stream generator 14, packetized video and audio elementary data streams V-E and A-E are multiplexed, and the system clock reference counter flags (PCR and PCR extension) are inserted into transport stream T. The structure of transport stream T is adequately specified in the MPEG standard.

To generate packetized video and audio elementary data streams V-E and A-E, analog video and audio signals V and A are sampled from an analog source 15 at a defined sampling rate $f_{video}$ for the analog video signals and $f_{audio}$ for the analog audio signals, then compressed and packetized in encoders and packetizers 16a, 16b.

Figure 5:
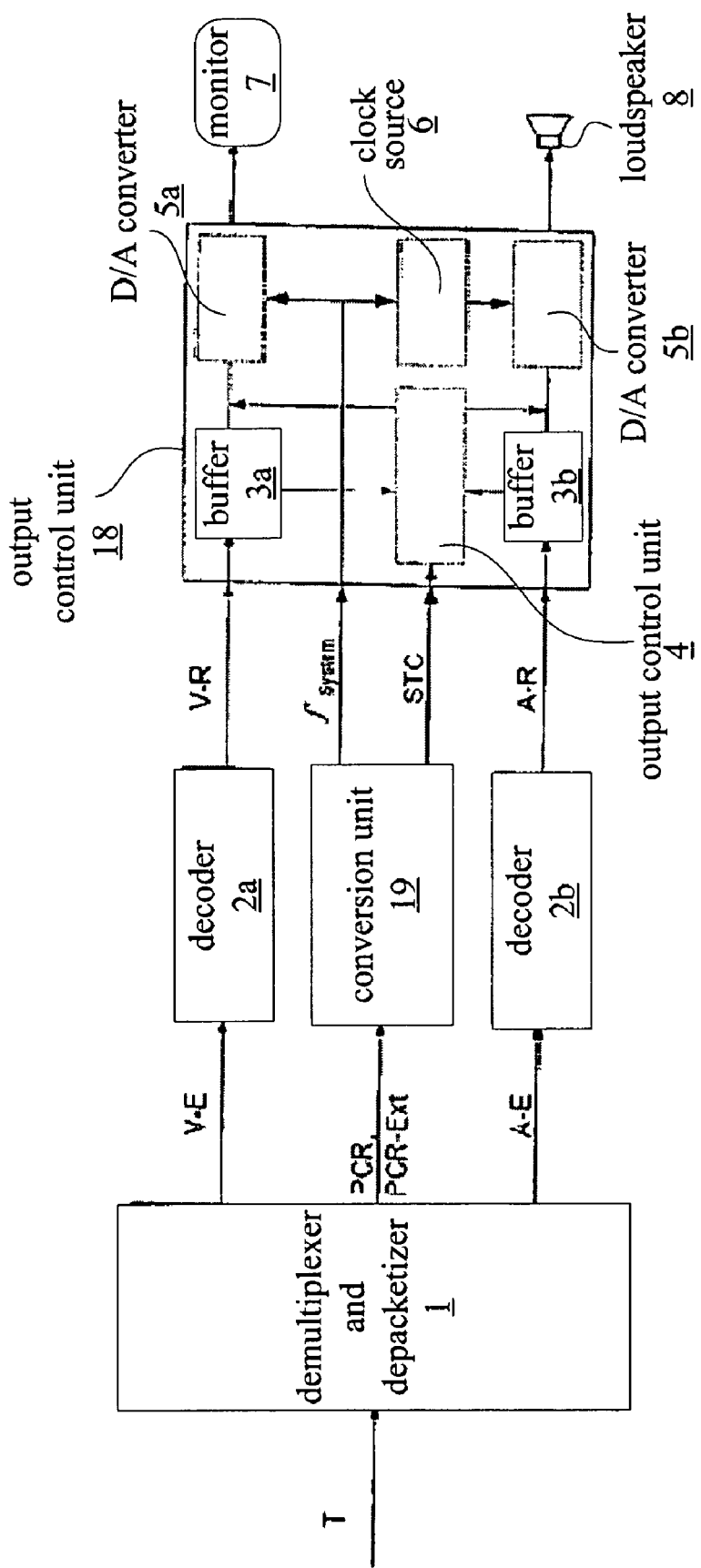
FIG. 5 shows a block diagram of a conventional receiving device for digital data streams.

FIG. 5 shows a conventional receiving device that, in turn, includes a transport data stream demultiplexer 1, decoder and depacketizers 2a, 2b, and an output control unit 18 for synchronizing and presenting the data streams.

The system time clock in this case is recovered from system clock reference flags PCR and PCR extension in a conversion unit 19, and a system frequency $f'_{system}$ that corresponds to system time clock $f_{system}$ of the transmitter is derived therefrom. However, the system clock reference flags must be transmitted with a constant delay from the transmitting unit to the receiving unit throughout the entire system to ensure that the time intervals between consecutive flags are equivalent to the difference between them. The receiving device will no longer be operational if the system fails to ensure a constant end-to-end delay for transmitting the system clock reference flags.

What is claimed is:

1. A method for synchronizing a counter in a receiving device for digital data streams, comprising:
    generating the digital data streams in a transmitting device by sampling analog signals at a sampling frequency synchronized by a system time clock in the transmitting device;
    determining the sampling frequency of one of the data streams in the receiving device;
    synchronizing the counter with the determined sampling frequency of the one of the data streams;
    setting an increment of the counter; and
    determining the increment from a ratio between a program clock reference and the sampling frequency, wherein
    the determining the sampling frequency of the one of the data streams in the receiving device is without the transmitter transmitting a value of the system time clock; and
    the frequency of the system time clock in the transmitting device is not the same as the sampling frequency.

2. The method as recited in claim 1, further comprising:
    setting the increment to a constant value based on a nominal sampling frequency.

3. The method as recited in claim 1, further comprising:
    comparing an instantaneous presentation time stamp of a packetized elementary data stream used to determine the sampling frequency with an instantaneous count of the counter; and
    correcting the increment of the counter according to a comparison result of the comparing step.

4. The method as recited in claim 1, further comprising:
    determining the sampling frequency from the data stream having the greatest sampling frequency of any of the available data streams.

5. The method as recited in claim 1, wherein the digital data streams are packetized elementary data streams that include compressed video and audio data streams according to the Moving Picture Expert Group (MPEG) standard.

6. The receiving device as recited in claim 1, wherein:
    the sampling frequency is determined from a selected packetized elementary data stream of different packetized elementary data streams; and
    all packetized elementary data streams are synchronized with the counter.

7. The method as recited in claim 1, wherein a system time clock counter of the receiving unit is controlled by the determined sampling frequency without consideration of a received value of the system time clock of the transmitter.

8. The method as recited in claim 1, wherein the transmission of the transmitting device comprises packetized elementary data streams and presentation time stamps.

9. The method as recited in claim 8, wherein the presentation time stamps indicate a time of transmission.

10. A receiving device, comprising:
    a transport data stream demultiplexer for demultiplexing a transport data stream into packetized elementary data streams and for extracting flags that identify a presentation time stamp for the purpose of initializing a counter;
    a unit for correctly determining a sampling frequency of one of the packetized elementary data streams;
    an output control unit for synchronizing data streams obtained from the packetized elementary data streams; and
    a synchronization unit for synchronizing the counter according to the sampling frequency, wherein the determining the sampling frequency of the one of the packetized elementary data stream is without a transmitter transmitting a value of the system time clock;
    wherein the synchronization unit sets an increment of the counter, the increment being determined from a ration between a program clock reference and a nominal sampling frequency.

11. The receiving device as recited in claim 10, wherein the increment is set to a constant value based on a nominal sampling frequency.

12. The receiving device as recited in claim 10, wherein:
    the synchronization unit compares an instantaneous value of the presentation time stamp of the packetized elementary data stream used to determine the sampling frequency with an instantaneous count of the counter; and
    the synchronization unit corrects the increment of the counter according to a comparison result.

13. The receiving device as recited in claim 10, wherein:
    the unit for correctly determining the sampling frequency determines the sampling frequency from a selected packetized elementary data stream of different packetized elementary data streams; and
    the output control unit synchronizes all packetized elementary data streams with the counter.

14. The receiving device as recited in claim 13, wherein the sampling frequency is determined from the elementary data stream having the greatest sampling frequency of any of the available packetized elementary data streams.

15. The receiving device as recited in claim 10, wherein the packetized elementary data streams are compressed video and audio data streams according to the Moving Picture Expert Group (MPEG) standard.

* * * * *